May 3, 1932.  E. P. HOPWOOD  1,856,810
VENTILATOR
Filed Dec. 7, 1929
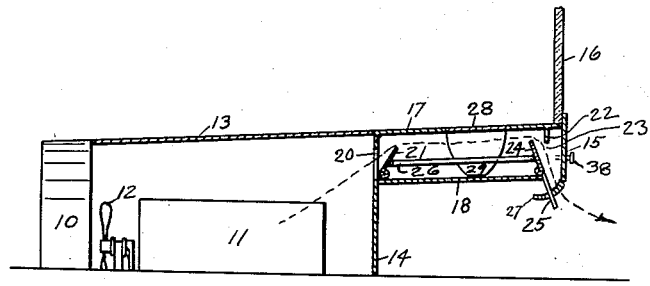
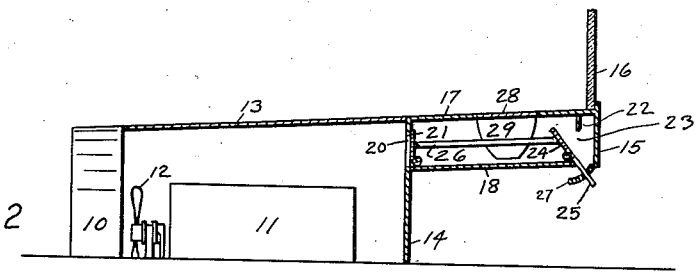
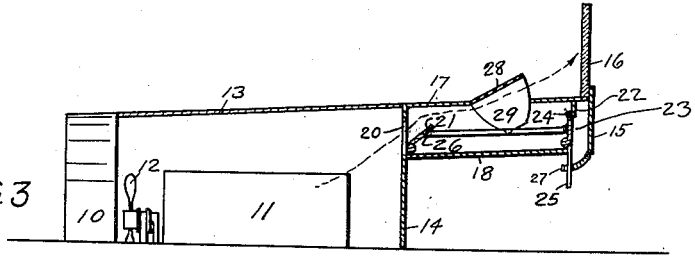
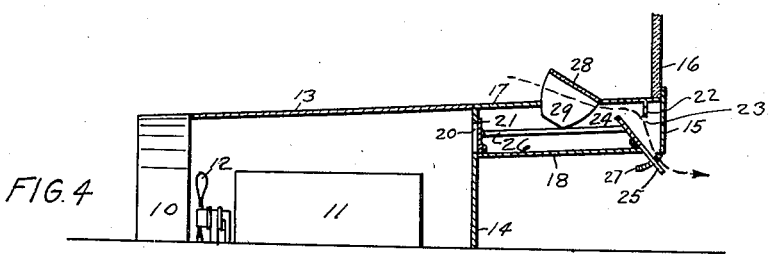
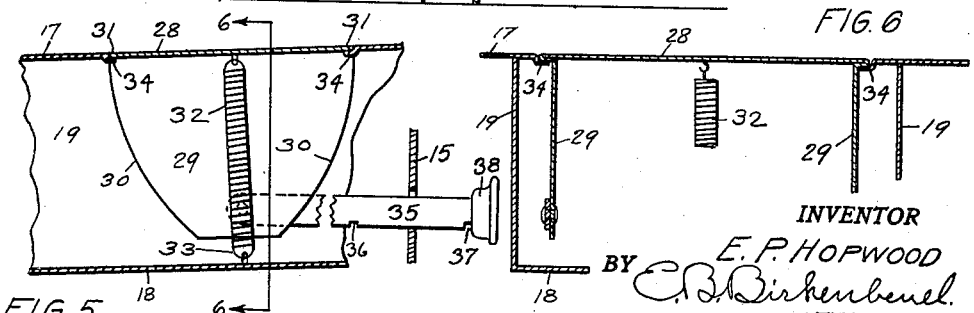
INVENTOR
E. P. HOPWOOD
BY C. B. Birkenbeuel
ATTORNEY Patented May 3, 1932

1,856,810

UNITED STATES PATENT OFFICE

ERNEST P. HOPWOOD, OF PORTLAND, OREGON

VENTILATOR

Application filed December 7, 1929. Serial No. 412,301.

This invention relates generally to the automobile industry, and particularly to ventilators used in conjunction therewith.

The main object of this invention is to provide a new form of ventilator which will be capable of supplying cool or warm air to the interior of the automobile, or which can be used to direct a stream of warm air against the outside of the wind-shield for the purpose of keeping same free from snow, ice, frost or mist.

The second object is to provide a simple form of ventilator having an exceedingly wide range of use and which will be easy to manufacture and install and simple to operate.

The third object is to so construct the ventilator that the outward appearance of the automobile need not be changed at all.

These, and other objects, will become more apparent from the specification following as illustrated in the accompanying drawings, in which:

Figure 1 is a longitudinal section through an automobile engine compartment extending back to the dash showing the delivery of warm air to the interior of the car.

Figure 2 is a view similar to Figure 1 showing the ventilator completely shut off.

Figure 3 is similar to Figure 2 showing warm air being directed against the outside of the wind-shield.

Figure 4 is similar to Figure 3 showing cold air being delivered to the interior of the car.

Figure 5 is an enlarged longitudinal section through the ventilator.

Figure 6 is a section taken along the line 6—6 in Figure 5.

Similar numbers of reference refer to similar parts throughout the several views.

Referring in detail to the drawings, there is shown a radiator 10 of an engine 11 provided with the usual fan 12 and covered with a hood 13 which extends to the usual upright wall 14 at the back of the engine compartment. There is also indicated an instrument board 15 over which is a glass wind-shield 16 which may be of any desired type. Between the wall 14 and the instrument board 15 is the top 17 of the body of the automobile.

The parts thus far described are similar to those found in the ordinary automobile construction.

Referrring particularly to my invention it will be seen to consist of a wind box 18 whose sides 19 are secured to the body 17 between the members 14 and 15, although not extending completely to the board 15. In the wall 14 is formed a warm air inlet opening 20 behind which is hinged a door 21. At the rear end of the wind box 18, and spaced from the instrument board 15, is an end wall 22 in which is formed an outlet 23. The door 24 controls the outlet 23. The door 24 is provided with a downwardly extending lever 25 by means of which it can be operated. The door 24 is joined to the door 21 by a connecting rod 26 which permits the lever 25 to operate both the doors 21 and 24. The position of the lever 25 is determined by a quadrant 27 into the notches of which the lever 25 may be positioned.

The mechanism thus far described controls the flow of air through the wind box and will be described later.

Turning now to the ventilator door 28 in the top 17 it will be seen to include a pair of side wings 29 whose edges 30 are arcs struck from the opposite edges 31 of the door 28. In the center of the door 28 is secured a spring 32 whose lower end 33 is attached to the wind box 18. The door 28 is supported on the inturned edges 34 which extend around the opening formed for the ventilator door 28. Attached to a side wing 29 is a bar 35 which projects through the instrument board 15. The bar 35 is provided with notches 36 and 37, either of which can engage the power portion of the slot formed for the bar 35. A button 38 is placed on the end of the bar 35 to facilitate its movement.

The operation of the device is as follows: If it is desired to warm the interior of the car from the heated air in the engine compartment the button 38 is permitted to move to the position shown in Figure 5, under tension of the spring 32, which urges the door 28 to a closed position. The lever 25 is then moved to an intermediate position shown in Figure 1 which allows the doors 21 and 24 to open and permits air to flow from the engine compartment through the wind box 18 into the car.

If it is desired to dispense with this warm air the lever 25 is pulled toward the driver (as shown in Figure 2) causing the door 21 to close.

If it is desired to direct a flow of warm air against the exterior of the wind-shield for the purpose of removing ice, snow, frost or moisture the lever 25 is pushed away from the operator (as shown in Figure 3) causing the door 24 to close and the door 21 to open. The button 38 is then drawn out toward the operator causing the notch 36 to engage the board 15, thereby tilting the door 28 (as shown in the same figure) thus providing a free passage of air from the engine compartment through the opening 20, controlled by the ventilator door 28 against the wind-shield 16.

If it is desired merely to have unwarmed fresh air enter the automobile, the button 38 is pushed in as far as it will go, thereby tilting the door 28 in the opposite direction (as shown in Figure 4). It will also be necessary to reverse the position of the lever 25, which will open the door 24 and close the door 21.

It can thus be seen that by a relatively simple arrangement of parts it is possible to provide warm or cold air to the automobile interior, or to direct a stream of warm air from the engine compartment against the outside of the wind-shield.

Obviously, in its simpler form the swinging doors 21 and 24 can be dispensed with altogether and the opening 23 as well, leaving the opening 20 free at all times and controlling the flow of air from the engine to the wind-shield by means of the door 28 alone.

It will also be understood that one or more of these units may be placed on the top of the body without departing from the spirit of this invention, it being customary to employ one or two ventilators at the present time, and the device which I have described is intended to have the same external appearance as does the ordinary ventilator when in a closed position.

I am aware that these results can be accomplished in a number of different ways, and I therefore do not intend to limit myself to the precise form illustrated in the drawings, but intend to cover all such forms and modifications thereof as fall fairly within the appended claims.

I claim:

1. A ventilator for automobiles, the combination of a reversible door in the top side of an automobile body directly in front of the wind-shield adapted to open forwardly or backwardly, means for controlling said door, and a wind box under said ventilator communicating therewith and with the interior of the engine compartment and with the interior of the automobile, said wind box having control doors at its points of communication with said engine compartment and automobile interior.

2. A ventilator for automobiles comprising a door in the top of an automobile body adapted to hinge on either its front or rear edges, means for controlling the position of said door, a wind box communicating between the engine compartment of the automobile and said ventilator door, a door in said wind box communicating with the interior of the automobile, and means for controlling said last mentioned door.

3. A ventilator for automobiles consisting of a reversible door in the top of an automobile body directly in front of the wind-shield, a wind box under said door having an opening at the rear thereof communicating with the interior of the automobile, an opening at the front thereof communicating with the engine compartment, said wind box openings having doors for controlling the flow of air therethrough, means for controlling said doors in unison, and means for holding said doors in a manner that either one shall be in a closed position or both shall be in an open position.

ERNEST P. HOPWOOD.